(12) United States Patent
Hannan et al.

(10) Patent No.: US 12,069,631 B2
(45) Date of Patent: Aug. 20, 2024

(54) METHOD AND SYSTEM FOR ENHANCING CAPACITY OF RADIOS SHARING SPECTRUM

(71) Applicant: CommScope Technologies LLC, Hickory, NC (US)

(72) Inventors: Ariful Hannan, Sterling, VA (US); Khalid W. Al-Mufti, Sterling, VA (US)

(73) Assignee: CommScope Technologies LLC, Claremont, NC (US)

( * ) Notice: Subject to any disclaimer, the term of this patent is extended or adjusted under 35 U.S.C. 154(b) by 368 days.

(21) Appl. No.: 17/601,300

(22) PCT Filed: Feb. 24, 2020

(86) PCT No.: PCT/US2020/019410
§ 371 (c)(1),
(2) Date: Oct. 4, 2021

(87) PCT Pub. No.: WO2020/209941
PCT Pub. Date: Oct. 15, 2020

(65) Prior Publication Data
US 2022/0159658 A1 May 19, 2022

(51) Int. Cl.
*H04W 72/0453* (2023.01)
*H04W 16/14* (2009.01)

(52) U.S. Cl.
CPC ....... *H04W 72/0453* (2013.01); *H04W 16/14* (2013.01)

(58) Field of Classification Search
None
See application file for complete search history.

(56) References Cited

U.S. PATENT DOCUMENTS 5,519,694 A * 5/1996 Brewer ................... H04L 45/00
379/272
8,724,740 B2 * 5/2014 Kim ..................... H04B 7/0417
455/70

(Continued)

FOREIGN PATENT DOCUMENTS

CN 102916657 A * 2/2013 ............... H03F 1/48
CN 106792731 A 5/2017

(Continued)

OTHER PUBLICATIONS

Alli, "Allocating radio frequencies using graph coloring." Kent State University, 2016 <https://www.cs.kent.edu/~dragan/ST-Spring2016/Allocating%20radio%20frequencies%20using%20graph%20coloring.pdf>.*

(Continued)

*Primary Examiner* — Andrew C Oh
(74) *Attorney, Agent, or Firm* — Fogg & Powers LLC

(57) ABSTRACT

Methods and apparatuses for determining an assignment of frequency channels to radios of a spectrum access system are provided and which result in at least one of: (a) an enhanced transmit power-bandwidth product or an enhanced probable transmit power-bandwidth product for all radios, (b) diminished interference between radios of different nodes, and (c) diminishing changes to frequency channels either requested by or previously assigned to radios.

25 Claims, 3 Drawing Sheets

(56) References Cited

U.S. PATENT DOCUMENTS

| | | | | |
|---|---|---|---|---|
| 8,995,547 | B2* | 3/2015 | Kim | H04B 7/0632 375/267 |
| 10,098,005 | B2 | 10/2018 | MacMullan et al. | |
| 2006/0039286 | A1* | 2/2006 | Basu | H04L 45/02 370/238 |
| 2006/0068805 | A1* | 3/2006 | Rhemtulla | H04W 16/18 455/452.2 |
| 2006/0187097 | A1* | 8/2006 | Dolazza | H03M 3/496 341/143 |
| 2006/0289960 | A1* | 12/2006 | Wu | H01L 31/105 257/458 |
| 2007/0109056 | A1* | 5/2007 | Kwa | H03F 1/486 330/308 |
| 2009/0096647 | A1* | 4/2009 | Nazemi | H03M 1/44 341/122 |
| 2010/0165829 | A1* | 7/2010 | Narasimha | H04L 27/2614 370/344 |
| 2011/0110342 | A1* | 5/2011 | Hsuan | H04W 36/0038 370/344 |
| 2014/0066050 | A1* | 3/2014 | Kotecha | H04W 72/51 455/422.1 |
| 2015/0079974 | A1 | 3/2015 | Farhadi et al. | |
| 2017/0013465 | A1 | 1/2017 | Luo et al. | |
| 2018/0376341 | A1* | 12/2018 | Khoshnevisan | H04W 16/12 |
| 2019/0069187 | A1 | 2/2019 | Ashrafi | |

FOREIGN PATENT DOCUMENTS

| | | | | |
|---|---|---|---|---|
| CN | 108496384 A | * | 9/2018 | H04B 1/1027 |
| DE | 10147885 A1 | * | 4/2003 | H01L 33/20 |
| EP | 1732240 A1 | * | 12/2006 | H04B 1/71055 |
| EP | 2551850 A1 | * | 1/2013 | G06K 9/6243 |
| EP | 2804413 A1 | * | 11/2014 | H04W 16/10 |
| ES | 2792498 T3 | * | 11/2020 | H04L 5/0007 |
| GB | 2465756 A | | 6/2010 | |
| JP | 2003023675 A | * | 1/2003 | H04B 1/709 |
| WO | WO-02073853 A1 | * | 9/2002 | H04J 13/00 |
| WO | WO-2009025596 A1 | * | 2/2009 | H04L 5/001 |
| WO | WO-2010043042 A1 | * | 4/2010 | H04L 1/0042 |

OTHER PUBLICATIONS

CBRS Alliance, "CBRS Alliance Release 1 Specifications", CBRS Coexistence Technical Specification, CBRSA-TA-2001, V2.0.0, Mar. 11, 2019, pp. 1 through 28, CBRS Alliance.

Eisentblatter et al., "Frequency Planning and Ramifications of Coloring", Discussiones Mathematicae Graph Theory 22, 2002, pp. 51 through 88.

Federal Register, "Shared Commercial Operations in the 3550-3650 MHz Band", Federal Communications Commission, Federal Register Rules and Regulations, Jun. 23, 2015, pp. 36164 through 36230, vol. 80, No. 120.

Grotschel et al., "Graph Colouring and Frequency Assignment", at least as early as Jan. 3, 2019, pp. 1 through 61, ZIB, www.zib.de/groetschel.

International Searching Authority, "International Search Report and Written Opinion from PCT Application No. PCT/US2020/019410", Jun. 16, 2020, pp. 1 through 10, Published: WO.

Khoshnevisan et al., "Text Proposal for Inter-CxG Coexistence" CBRS Alliance Technical WG: Coexistence TG CBRS Coexistence Technical Report, Nov. 14, 2016, pp. 1 through 8, CBRS Alliance.

Khoshnevisan et al., "Text Proposal for Inter-CxG Coexistence", CBRS Alliance Technical WG: Coexistence TG CBRS Coexistence Technical Report, Dec. 1, 2016, pp. 1 through 10, CBRS Alliance.

Moore, "Greedy Algorithms", Brilliant Math & Science Wiki, at least as early as Feb. 27, 2019, pp. 1 through 5, https://brilliant.org/wiki/greedy-algorithm/.

Wireless Innovation Forum, "Inter Coexistence Group GAA Resource Allocation", Spectrum Sharing Committee, Working Group 1, WINNF-18-I-00007, Jan. 10, 2018, Software Defined Radio Forum.

Wireless Innovation Forum, "WINNF-TR-2003 GAA Spectrum Coordination-Approach 1 Technical Report", SSC Working Group 5, Coexistence Methods Task Group, Spectrum Sharing Committee Working Group (Operations) GAA Spectrum Coordination-Approach 1 Technical Report WINNF-TR-2003-V0.0.0-r2.0, Jan. 17, 2019, pp. 1 through 26, The Software Defined Radio Forum Inc.

European Patent Office, "Extended European Search Report", from EP Application No. 20787428.0, from Foreign Counterpart to U.S. Appl. No. 17/601,300, Dec. 9, 2022, pp. 1 through 11, Published: EP.

* cited by examiner

METHOD AND SYSTEM FOR ENHANCING CAPACITY OF RADIOS SHARING SPECTRUM

CROSS-REFERENCE TO RELATED APPLICATIONS

The present application claims benefit of U.S. Patent Application Ser. No. 62/830,947, filed Apr. 8, 2019; the entire contents of the aforementioned patent application are incorporated herein by reference as if set forth in its entirety.

BACKGROUND

Shared spectrum usage by governmental and commercial users has been proposed, e.g. for Citizens Broadband Radio Service (CBRS) specified by the United States Federal Communications Commission (FCC). With shared spectrum usage, a multitude of wireless service providers may utilize such spectrum. Each service provider would employ a system of general authorized access (GAA) citizens broadband radio service device(s) (CBSD(s)), such as base station(s), e.g. that would facilitate communications with user equipment (UE). The system's CBSDs would be coupled to other networks, such as the Internet, e.g. by a core network.

SUMMARY OF THE INVENTION

A method of determining frequency channel assignments to radios is provided. The method comprises: creating a new network graph or modifying a previously existing network graph; using the new or modified network graph, determining an interference network graph for radios authorized to transmit in the shared spectrum using a transmit power spectral density level and a frequency channel specifically requested by each radio, where the interference network graph comprises at least two nodes and at least one interference edge connecting two nodes, and where each node comprises one or more radios operated by the same operator; determining a chromatic number, z, of the interference network graph; determining combinations or permutations of frequency channel mappings for a number of frequencies, n, that can be assigned to at least one radio in each of the nodes of the interference network graph; for each frequency channel mapping of the determined combinations or permutations of the frequency channel mappings that can be assigned to the radios of the different nodes, determining a maximum transmit power spectral density level that is allowable for all radios of each node so that an aggregate interference level at at least one protection point will not exceed an aggregate interference threshold level; using a cost function, determining an assignment of frequency channels to radios of each node that results in at least one of: (a) an enhanced transmit power-bandwidth product or an enhanced probable transmit power-bandwidth product for all radios, (b) diminished interference between radios of different nodes, and (c) diminishing changes to frequency channels either requested by or previously assigned to radios; and assigning the determined frequency channels and corresponding resulting enhanced transmit power-bandwidth product levels or probable enhanced transmit power-bandwidth product levels to corresponding radios, where the radios are configured to operate on their assigned frequencies and to transmit at their assigned enhanced transmit power-bandwidth product levels or probable enhanced transmit power-bandwidth product levels.

DRAWINGS

DETAILED DESCRIPTION

Figure 1:
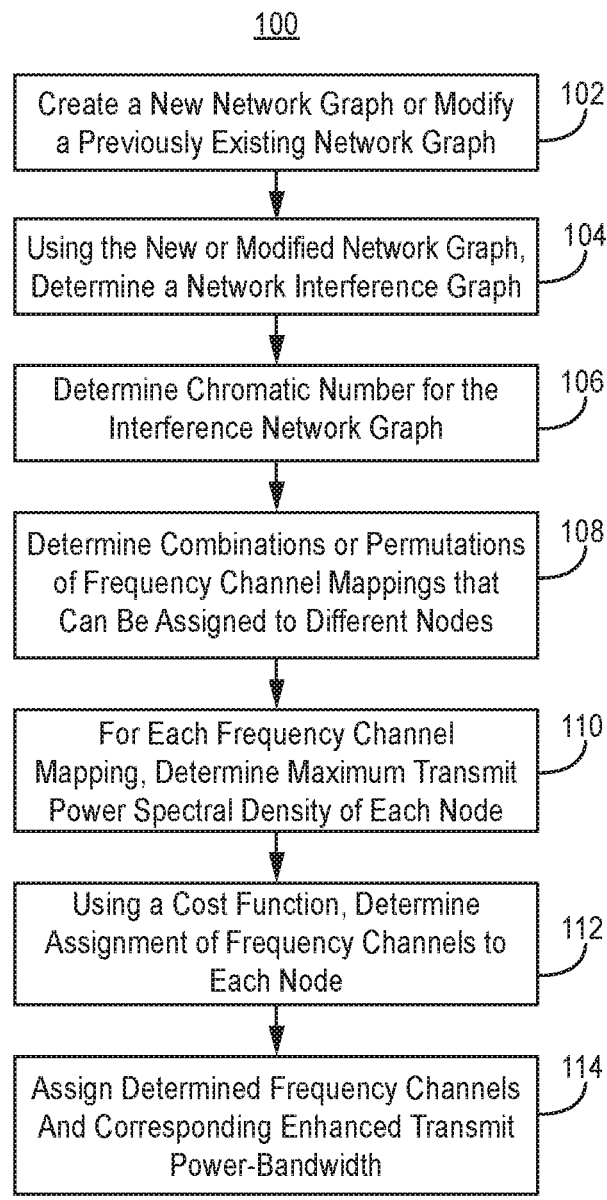
FIG. 1 illustrates one embodiment of a method for determining frequency and power spectral density assignment to secondary users.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

It is desirable to enhance, e.g. maximize, the capacity, i.e. transmit power-bandwidth product of radios utilized by non-incumbent (or secondary) users, sharing spectrum with incumbent (or primary) users. The capacity of secondary user radios sharing spectrum can be enhanced utilizing a cost function.

CBRS is one example of a shared spectrum service. For pedagogical reasons, a shared spectrum service will be illustrated with a shared access system (SAS) whose secondary users are CBSDs, e.g. GAA CBSDs. A GAA CBSD uses a GAA channel assigned by a SAS controller. However, embodiments of the invention can be implemented for other types of shared spectrum services. CBSDs are radio frequency (RF) access devices, such as base stations, and may be more generally referred to as radios used in shared spectrum services.

FIG. 1 illustrates one embodiment of a method 100 for determining frequency and power spectral density assignment to secondary users, e.g. GAA CBSDs of a SAS will now be illustrated. To the extent that the method 100 shown in FIG. 1 is described herein as being implemented in the system shown in FIG. 3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 102, creating new network graph or modifying a previously existing network graph. The network graph comprises one, two, three, or more nodes, where each node comprises one or more GAA CBSDs registered as part of a SAS. Each GAA CBSD may have a maximum transmit power spectral density such as 30 dBm/10 MHz for a category A GAA CBSD and 47 dBm/10 MHz for a category B GAA CBSD.

Such creation or modification of an interference network graph may result from at least one GAA CBSD registering or deregistering as part of a SAS. Registration requires the GAA CBSD to request permission (e.g. from a SAS controller of a SAS) to transmit in a frequency channel of shared spectra controlled by the SAS and to receive such permission (e.g. from the SAS controller). Optionally, the SAS (e.g. a SAS controller of the SAS) determines whether to accept the registration request of a GAA CBSD and affects the registration if it so elects.

Deregistration requires that a GAA CBSD notify the SAS (e.g. the SAS controller) that it will no longer transmit in a previously assigned frequency channel of the shared spectra of the SAS, or that the SAS (e.g. the SAS controller) notifies a GAA CBSD that the GAA CBSD is no longer permitted to transmit in the previously assigned frequency channel.

The modification of a prior network graph results when unregistered GAA CBSD(s) are register and are added to an existing network graph or when previously registered GAA CBSD(s) deregister and are removed from an existing network graph. The creation of a new network graph results when no GAA CBSDs were previously registered as part of the SAS.

In block 104, determine an interference network graph for the GAA CBSDs of the SAS based on overlap region(s) formed by cell coverage area of GAA CBSDs, which can be determined using RF parameters of the GAA CBSD (e.g. transmit power spectral density level and/or antenna gain) and path loss from the GAA CBSD. The interference network graph is determined using the network graph created or modified in block 102. The interference network graph comprises at least two nodes and at least one interference edge connecting two nodes. Each node is formed by a set of one or more GAA CBSDs of the same operator. However, one or more different nodes may correspond to sets of GAA CBSD(s) operated by different operators.

In some cases, the node may be a vertex connecting two or more lines. Lines between, and thus connecting, two vertices represent an interference edge. An interference edge means an overlap region formed by cell coverage areas around the corresponding GAA CBSDs. Cell coverage area means a perimeter around GAA CBSD(s) corresponding to a minimum power per bandwidth level, emitted by the GAA CBSD(s), that can be detected by user equipment, e.g. −96 dBm/MHz. There are no vertices (or interference edges) between nodes comprising GAA CBSDs of the same operator as the operator is expected to manage interference between its GAA CBSDs using time or frequency division duplexing.

The overlap region as used in the aforementioned definition of interference edge may be any overlap region or an overlap region have at least one parameter exceeding a corresponding interference edge threshold level. In one embodiment, the existence of an interference edge can be numerically determined based upon an area of the overlap region with respect to the areas of the overlapping cell coverage areas. An interference edge exists between first and second nodes if a sum of a first edge parameter and a second edge parameter exceeds the interference edge threshold level. The interference edge threshold level may be established by a system designer, e.g. of the SAS controller. The first edge parameter equals a ratio of: (a) an area of the overlap region with respect to (b) the area of the cell coverage area of the second node. The second edge parameter equals a ratio of: (a) the area of the overlap region with respect to (b) the area of the cell coverage area of the first node.

Alternatively, the interference edge can be numerically determined based upon signal level and compared against the interference edge threshold level. An interference edge exists between first and second nodes if a sum (of a first edge parameter and a second edge parameter) divided by two exceeds the interference edge threshold level. The first edge parameter is a ratio of an average power spectral density level of GAA CBSD(s) of a first node in an overlap region to average power spectral density level of GAA CBSD(s) of a second node in the overlap region. The second edge parameter is the inverse of the first edge parameter. Average power spectral density level of GAA CBSD(s) may be determined by: (1) forming a grid of points in the overlap region, (2) estimating, at each point, the transmit power spectral density level of each of the CBSD(s) of the first node and the second node, and (3) generating an average transmit power spectral density level by summing the estimated powers at each point separately for each of the first node and the second node, and dividing each of the two summations by the number of points at which power was estimated. The power spectral density at each point can be estimated utilizing the transmission power spectral density requested by each of the corresponding CBSDs and the path loss based on a propagation model such as the irregular terrain model (ITM). The power spectral density at each point is also estimated using other parameters of the GAA CBSD, such as antenna height, antenna gain, and/or antenna azimuthal angle.

Figure 2:
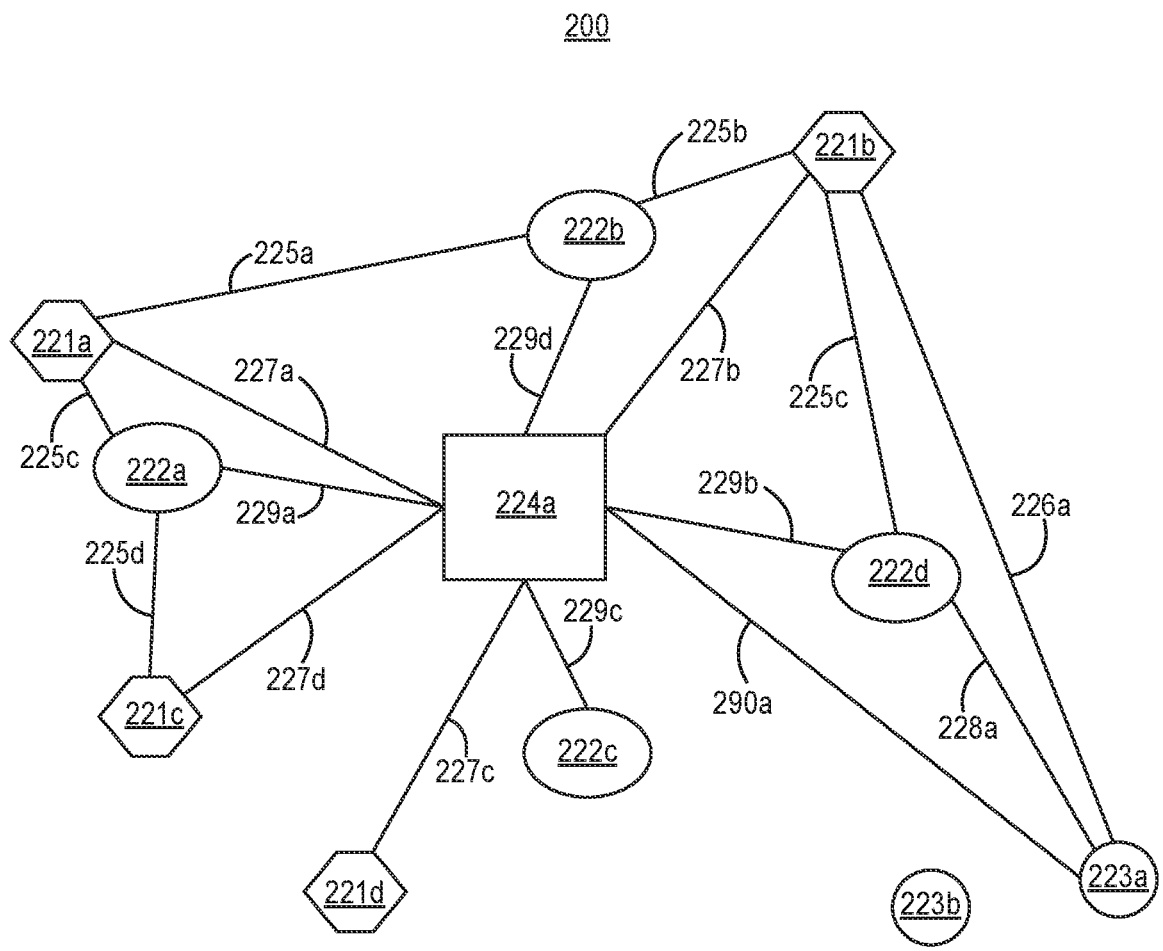
FIG. 2 illustrates an exemplary diagram of an interference network graph of a spectrum access system (SAS)

FIG. 2 illustrates an exemplary diagram of an interference network graph of a SAS. Each type shape—e.g. hexagons 221a-d, ellipses 222a-d, circles 223a-b, and quadrilateral 224a—uniquely represents a different operator of nodes. Each shape represents a unique node of at least one GAA CBSD. Thus, nodes having the same shape are each comprised of GAA CBSDs operated by the same operator. A pair of two different shapes may be connected by a line representing an interference edge for example as illustrated by lines 225a-3, 226a, 227a-d, 228a, 229a-d, 290a.

Returning to FIG. 1, in block 106, determine a chromatic number for the interference network graph. The chromatic number means at least one of—a minimum number and a most probable minimum number—of distinct frequency channels required so that no two sets of GAA CBSDs at any interference edge use the same frequency channel. Frequency channels may also be referred also to or represented by colors. When utilizing a number of frequency channels equal to the chromatic number, it is possibly that two or more operators may utilize the same frequency channel.

[1] Probable minimum number means a number that has the highest probability of being the minimum number.

Determining the minimum number of colors is a non-deterministic polynomial time problem for which a Greedy like algorithm may be used to heuristically determine the chromatic number which may be the minimum number of colors or a number close to the minimum number of colors. In the example illustrated in FIG. 2, the minimum number of colors is four. In the example of FIG. 2, the number of operators is also four, but this is not because the minimum number of colors is four.

Returning to FIG. 1, in block 108, determine combinations or permutations of color to frequency channel mappings (or frequency channel mappings) for a number of frequencies, n, that can be assigned to GAA CBSD(s) in each of the nodes of the interference network graph. Such a determination is intended to improve (or enhance) the transmit power-bandwidth product of each GAA CBSD, reduce interference amongst GAA CBSDs of different network operators, and/or to enhance stability of the corresponding shared spectrum communications system, e.g. changes to frequency channels either requested by or previously assigned to GAA CBSDs. Opportunistic spectrum sharing divides the total available shared spectrum (e.g. controlled by the SAS controller and which is for example 150 MHz)

by the chromatic number, z, so that all frequency channels are utilized by the GAA CBSDs. All possible permutations of m frequency channel mappings is determined in block 108 for opportunistic spectrum sharing. For opportunistic spectrum sharing, n is equal to the chromatic number z. Hence, for opportunistic spectrum sharing, the combinations of n is n!.

Non-opportunistic spectrum sharing entails assigning a fixed channel bandwidth, e.g. 10 MHz. Thus, the total number of available channels, n, is the total available bandwidth divided by fixed channel bandwidth, e.g. 15 channels. For non-opportunistic spectrum sharing, the determined combinations of frequency channels that can be assigned in block 108 comprises combinations of $$\binom{n}{z}$$

of the chromatic number z, where $$\binom{n}{z} = \frac{n!}{z!(n-z)!}.$$

For non-opportunistic spectrum sharing, n is greater than z. All possible combinations of frequency-to-color assignment (or frequency channel mapping m) is determined in block 108 for opportunistic spectrum sharing.

Optionally, determine whether opportunistic spectrum sharing or non-opportunistic spectrum sharing is being used. If opportunistic spectrum sharing is being used, then the determined combinations are the permutations of chromatic number. If non-opportunistic spectrum sharing is being used, then the determined combinations are the combinations of $$\binom{n}{z}$$

of the chromatic number.

In block 110, for each frequency channel mapping of the determined combinations or permutations of frequency channel mappings that can be assigned to the GAA CBSDs of the different nodes, determine a maximum transmit power spectral density level for each GAA CBSD(s) of each node so that an aggregate interference level at at least one protection point will not exceed an aggregate interference threshold level. $P_k$ represents the maximum transmit power spectral density level, e.g. in mW/MHz or another unit of power and frequency. k represents one of the GAA CBSDs of a node of the interference network graph. m represents one of the sets for assigning frequency channels to different nodes (and thus to the GAA CBSDs comprising those nodes).

Note, the interference network graph may or may not be redetermined upon performing block 110. For pedagogical reasons, the interference network graph will not be exemplified as being recalculated. Sometimes recalculating the interference network graph using the determined maximum transmit power spectral density levels can result in system instability.

Protection points are points where a primary user may be located, and at which aggregate interference from secondary users, e.g. GAA CBSDs, must not exceed an aggregate interference threshold level to limit interference to receivers of the primary users which may be at such points. The protection points are fixed in location and deemed to have a receiver receiving all the time at the protection point. The aggregate interference threshold level may be set by a standards body or by government(s).

If a GAA CBSD does not interfere with any protection points, the maximum transmit power spectral density level of the GAA CBSD is the transmit power spectral density level requested by the GAA CBSD. If one or more of the GAA CBSDs comprising nodes of the interference network graph interferes with one or more protection points, then determine the maximum transmit power spectral density level of those interfering GAA CBSD(s) so that the interference at each protection point does not exceed an aggregate interference threshold level. If a CBSD interferes with two or more protection points, the maximum transmit power spectral density level of the GAA CBSD is the minimum transmit power spectral density level calculated for the GAA CBSD with respect to each protection point which the GAA CBSD interferes.

In one embodiment, the maximum transmit power spectral density level of a GAA CBSD interfering with a protection point is determined using an iterative allocation process (TAP). However, other techniques may be used. WInnForum Shared Access System (SAS) general requirement (requirement) R2-SGN-16 of WINNF-TS-0112 defines the IAP. The IAP determines such maximum transmit power spectral density levels by allocating interference margin fairly to CBSDs in neighborhood(s) of protection point(s) proximate to the CBSDs. The IAP determines such transmit power spectral levels by allocating interference margin fairly to CBSDs in neighborhoods of protection point(s), e.g. of one or more of each of a fixed satellite service (FSS), priority access license (PAL) protection area (PPA), grandfathered wireless protection zone (GWPZ), and an environmental sensing capability (ESC) system.

Optionally, the resulting maximum transmit power spectral density level for each GAA CBSD of each node may be stored in a three-dimensional matrix, e.g. database, and/or in a three-dimensional graphical plot having the following three variables (e.g. indices): GAA CBSD node identifier, GAA CBSD transmit power spectral density level, and frequency channel assignment number. Each frequency channel assignment number corresponds to a different set for assigning frequency channels, e.g. a different combination or permutation respectively for non-opportunistic and opportunistic spectrum sharing.

In block 112, using a cost function, determine an assignment of frequency channels to the GAA CBSDs of each node that results in at least one of: (a) an enhanced transmit power-bandwidth product or respectively an enhanced probable transmit power-bandwidth product[2] for all GAA CBSDs, (b) diminished interference between GAA CBSDs of different network operators (and hence nodes), and (c) diminishing changes to frequency channels either requested by or previously assigned to GAA CBSDs. Optionally, the interrelationship between enhancing transmit power spectral density level, diminishing interference, and diminishing frequency channel changes can be manipulated by adjusting weighting factors for each of the foregoing; an example of this will be subsequently described. Further, the assignment may or may not be made using constraints.

[2] Probable transmit power-bandwidth product is a transmit power-bandwidth product that has a highest probability of being the maximum transmit power-bandwidth product.

In one embodiment, the assignment is determined by determining a value for a cost function for each possible unique, e.g. combination or permutation, of assignments of frequency channels. The determined value may be a maximum or a minimum value depending upon the cost function.

An exemplary cost function is illustrated for pedagogical reasons. However, other cost functions may be utilized. At least one of a frequency channel assignments for improving GAA CBSD transmit power-bandwidth product, for diminishing interference, and for maintaining stability for all GAA CBSDs (e.g. diminishing changes to frequency channels either requested by or previously assigned to GAA CBSDs) is determined with respect to this exemplary cost function. The exemplary cost function, C(m), is:

$$C(m) = \frac{\sum_{k=1}^{N}\{w_1 * T_k(m) - w_2 * I_k(m)\}}{\frac{N * \text{maxBW}}{z} * \sum_{k=1}^{N} PCAT_k} - \frac{w_3 * \sum_{k=1}^{N} M_k(m)}{N},$$

where $T_K$ is the throughput function of a $k^{th}$ GAA CBSD for a $m^{th}$ frequency channel mapping;
$I_K$ is the average interference to the $k^{th}$ GAA CBSD from other GAA CBSDs for the $m^{th}$ frequency channel mapping m;
maxBW is the maximum bandwidth for a GAA CBSD, e.g. ~150 MHz; however, the maximum bandwidth can be larger or smaller;
$PCAT_k$ is a maximum power (e.g. mW) of the $k^{th}$ GAA CBSD (e.g. based upon GAA CBSD category);
N is the number of CBSDs in the interference network graph;

$$T_k(m) = P_k(m) * BW_k(m),$$

where is $P_k$ transmit power spectral density (e.g. m)/MHz) and $BW_k$ is a bandwidth for the $k^{th}$ CBSD for the $m^{th}$ channel mapping;

$$I_k(m) = \sum_{l \neq k}^{N} I_l(m);$$

where $I_k$ is the aggregate interference from other GAA CBSDs at a $k^{th}$ GAA CBSD in overlapping bandwidth, where $I_l(m)$ is an interference (e.g. mW) at the $k^{th}$ GAA CBSD from a $l^{th}$ GAA CBSD in the overlapping bandwidth, and
where the interference $I_k=0$ if all frequency channels are orthogonal;
$M_k(m)$ is the mis-match factor, where $M_k=0$ if a requested frequency channel by a $k^{th}$ radio matches a corresponding assigned channel for the $m^{th}$ frequency channel mapping, and $M_k=1$ if the requested frequency channel by the $k^{th}$ radio does not match a corresponding assigned channel for the $m^{th}$ frequency channel mapping or if a channel assignment is changed from a prior channel assignment. For example, for a network of GAA CBSDs that is a radio access network (RAN), the RAN may include an element management system (EMS) comprising a self organizing network (SON) function; the EMS may identify a frequency channel requested by a CBSD of the RAN or by the EMS on behalf of such CBSD. However, in other embodiments, $M_k(m)$ can be a non-integer number dependent on the foregoing and/or other factors; and w1, w2 and w3 are weighting factors that can be dependent on the network parameters, and/or system designer(s) and/or user(s). In one example, $w_1 \geq w_2 \geq w_3$; however, this may not always be the case. Optionally, other embodiments of the cost function may not include one or two of: the transmit power-bandwidth product term (probable or otherwise; including $w_1$), the interference term (including $w_2$), and mis-match factor term (including $w_3$), e.g. by setting the corresponding weights to zero.

In the above equation, z is the chromatic number. For full orthogonalization of channels, $BW_k(m)$ can be calculated as $$BW_k(m) = \frac{150 \text{ MHz}}{z};$$

where 150 MHz is an exemplary nominal bandwidth for GAA CBSD; alternatively, the nominal bandwidth can be higher or lower. However, in cases where incumbent user is present, 150 MHz may not be available and in those cases $BW_k(m)$ may be reduced both due to available bandwidth and z. If the $BW_k(m)$ is less than a threshold bandwidth, e.g. 20 MHz, then $BW_k(m)$ can be increased. When $BW_k(m)$ is expanded beyond $$\left\{\frac{150 \text{ MHz}}{z}\right\},$$

then $I_k(M)$ will counteract the expansion so as to determine a maximum value of the cost function.

In one embodiment, each term of the cost model $$\left(\frac{\sum_{k=1}^{N}\{w_1 * T_k(m) - w_2 * I_k(m)\}}{\frac{N * \text{maxBW}}{z} * \sum_{k=1}^{N} PCAT_k} \text{ and } \frac{w_3 * \sum_{k=1}^{N} M_k(m)}{N}\right)$$

is designed to range between zero and one. Thus, the cost model may have a range from negative one to positive one. For example, this may be achieved by selecting the appropriate values of the aforementioned weights. However, the cost model can be designed differently to have different ranges. Parameters, e.g. transmit power spectral density levels, in the cost model should have consistent units, e.g. mW/MHz.

When determining—using the cost function—at least one of the frequency channel and transmit power spectral density assignment, constraints may or may not be used. If used, the constraints may include, for example, one or more of the following:

(a) assigning contiguous frequency channels to operators (coordinated operators) using the same radio access technology (RAT), transmission synchronization of network GAA CBSDs (e.g. to minimize co- or inter-channel interference), and timing of uplink and downlink signals in time division duplexing networks, are assigned adjacent frequency channels. Other operators (non-coordinated operators)—using different at least one of RATs, synchronization, and uplink downlink timing—are assigned frequency channels that are not adjacent to the frequency channels assigned to the coordinated operators; this reduces bandwidth of guard bands employed by a SAS; and (b) an absolute value of a difference between (i) an individual GAA CBSD transmit power spectral density level and (ii) an average transmit power spectral density level of the set of GAA CBSDs (utilizing the same frequency channel as the individual GAA CBSD) less than a delta power spectral density threshold level, e.g. 10 dB (however the transmit power threshold level may be smaller or larger).

The frequency channel assignment may be determined using the determined maximum transmit power spectral density level for each set determined in block 108, or for y sets of frequency channel assignments having highest determined maximum transmit power spectral density level as determined in block 110. The y sets are a subset of the sets of frequency channel assignments determined in block 108 and the number y may be specified, e.g. by a system designer or by a standards body. As illustrated in the cost function exemplified above, variable values other than transmit power spectral density level may be used to determine frequency channel assignment.

In block 114, assigning the determined frequency channels and corresponding enhanced transmit power-bandwidth product levels or enhanced probable transmit power-bandwidth levels to corresponding GAA CBSDs. The GAA CBSDs are configured to operate on their assigned frequencies, and to transmit at their assigned enhanced transmit power-bandwidth product levels or enhanced probable transmit power-bandwidth level.

Figure 3:
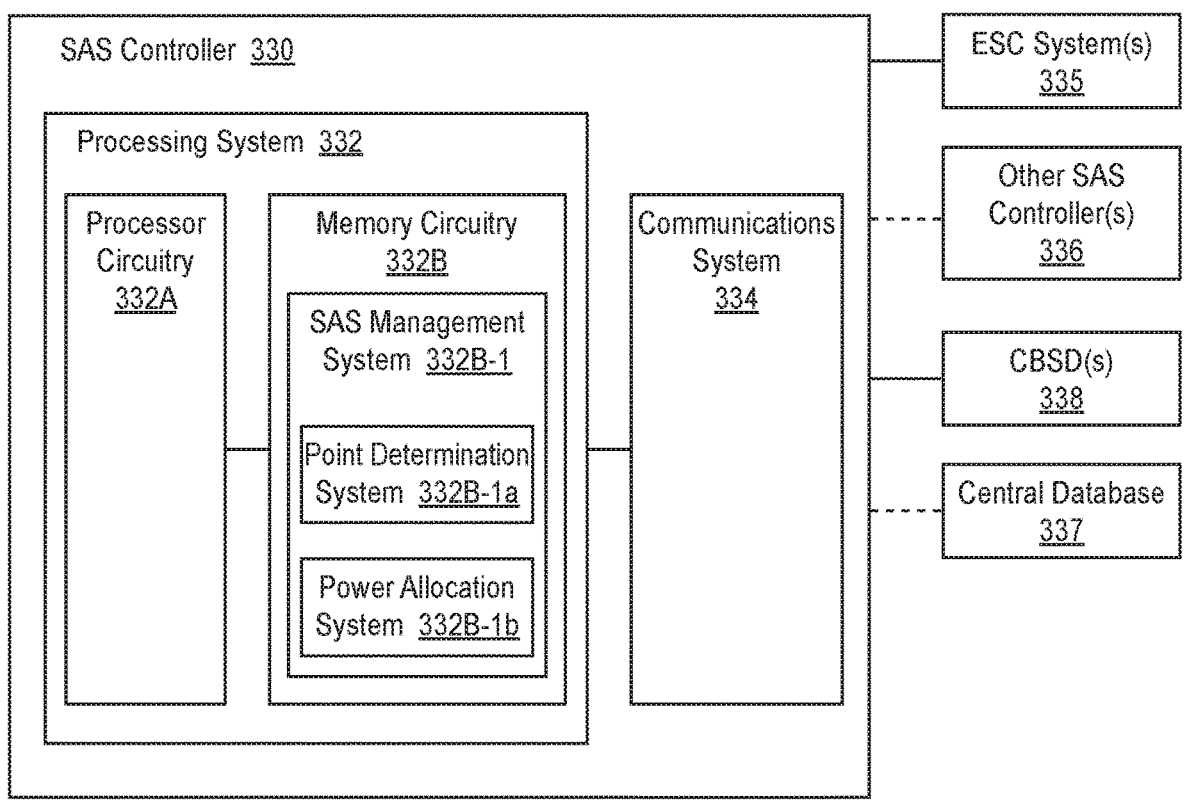
FIG. 3 illustrates one embodiment of a SAS that is implemented according to embodiments of the invention.

FIG. 3 illustrates one embodiment of a SAS 300 that is implemented according to embodiments of the invention. The illustrated SAS 300 includes a SAS controller 330 coupled to one or more CBSDs (CBSD(s)) 338. Each CBSD is operated by a GAA user and/or a PAL. For a network of GAA CBSDs, e.g. a RAN, an EMS may or may not be used to communicatively couple the GAA CBSDs to the SAS controller 330; the corresponding EMS would be part of the CBSDs 338 illustrated in FIG. 3.

Optionally, for CBRS, the SAS controller 330 can implement the method illustrated above. However, the method may be implemented differently in other systems. An optional way of implementing the illustrated method is subsequently described with respect to a particular implementation of the processing system; however, this implementation is exemplary and for pedagogical purposes only. The methods may be implemented in the SAS controller 330 in different ways.

In one embodiment, the SAS controller 330 is coupled to at least one environmental sensing capability system (ESC system(s)) 335. In another embodiment, the SAS controller 330 is coupled to a central database 337, e.g. which has information about when certain incumbent users (such as satellite ground stations) and/or PALs are transmitting. In a further embodiment, the SAS controller 330 is coupled to at least one other SAS controller (other SAS controller(s)) 336, e.g. controlling other CBSDs operating in the same or overlapping frequency spectrum. For example, such other CBSDs controlled by other SAS controller(s) 336 and their PALs, GAA users, and associated incumbent users may generate electromagnetic energy that overlaps the geographic region and frequency spectrum of the CBSDs 338 controlled by SAS 330, and thus must be accounted for by the SAS 330 when the SAS 330 performs interference analysis and authorizes operation of CBSD(s) 338 of the PAL(s) and/or the GAA user(s). Alternatively, the SAS 330 and its PALs and GAA users, may generate electromagnetic energy that overlaps the geographic region of the other SAS(s) 336, and thus must be accounted for by the other SAS controller(s) 336 when the other SAS(s) 336 perform interference analysis, and authorize operation of CBSDs of PALs and GAA users (associated with the other SAS(s) 336). By coupling SASs that are geographically proximate to one another, each SAS can account for electromagnetic energy emitted from those proximate geographies.

The ESC system 335 detects, and communicates to the SAS controller 330, the presence of signal(s), e.g. from some incumbent user(s), such as RADARs. Alternatively, incumbent users can inform the SAS controller 335 that they are operating, e.g. by transmitting a signal beacon, or communicating with the central database 337 which may be coupled to the SAS controller 330. Prior to notification of operation of an incumbent, the SAS controller 330 models aggregate interference where the incumbent user is or may be located, and may determine whether certain transmission power spectral densities of certain CBSDs should be reduced, e.g. to zero, in a frequency spectrum. Upon notification of operation of an incumbent user, the SAS controller 330 regulates the operation (e.g. power spectral density levels and frequencies of operation) of the CBSD(s) to allow the incumbent user(s) to operate free of interference. The SAS controller 330 otherwise controls the operation (e.g. power spectral density levels and frequencies of operation) of the GAA user(s)' CBSD(s) so that the PAL(s) system(s) operate free of interference.

In one embodiment, the SAS controller 330 includes a processing system 332 coupled to a communications system 334. The processing system 332 controls the operation of CBSD(s) 338 that form part of the SAS 200. The processing system 332 may also be referred to as processing circuitry.

The communications system 334 facilitates communications between the SAS controller 330 and other systems or devices, e.g. CBSD(s) 338, the ESC system(s) 125, the central database 337, and/or other SAS(s) 336. In one embodiment, the communications system 334 includes a modem, e.g. an Internet data modem, a radio, and/or any other communications device(s) that can facilitate communications to the aforementioned devices.

Optionally, the processing system 332 may be a state machine, e.g. comprised of the illustrated processor circuitry 332A coupled to the illustrated memory circuitry 332B. However, the processing system 332A may be implemented differently, e.g. as a neural network. In the illustrated embodiment, the memory circuitry 332B includes a SAS management system 332B-1.

In the illustrated embodiment, the SAS management system 332B-1 includes a point determination system 332B-1a and a power allocation system 332B-1b. The point determination system 332B-1a comprise at least one propagation model and determines which points (e.g. protection points) of a region require analysis by the power allocation process, as further described herein. The point determination system 332B-1a also determines the aggregate interference from CBSDs at each protection point. The power allocation system 332B-1b determines the maximum power spectral density level of certain CBSDs. Optionally, the power allocation system 332B-1b is implemented with an IAP that operates substantially accordingly to requirement R2-SGN-16; however, the power allocation system 332B-1b may be implemented in other ways to allocate, e.g. equitably, transmission power of CBSDs.

The SAS management system 332B-1 also includes techniques for determining the aggregate level of interference in frequency spectrum at each protection point. To this end, the SAS management system 332B-1 may include propagation models (e.g. free space path loss model, irregular terrain model and/or Hata model (or variations thereof)) with which to determine path loss between CBSDs and protection point(s). The SAS management system 332B-1 may also include a database of information about CBSDs (e.g. geographic location, height, terrain morphology, and/or effective radiated power information); additionally and/or alternatively, the SAS management system 332B-1 may remotely obtain such information.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

A processing system used in the present system and method can be implemented using software, firmware, hardware, or any appropriate combination thereof, as known to one of skill in the art. By way of example and not limitation, the processor circuitry 332A can include one or more of each of microprocessor circuitry, microcontroller circuitry, Digital Signal Processors (DSP) circuitry, Application Specific Integrated Circuits (ASICs), programmable logic device circuitry, and/or Field Programmable Gate Array (FPGA) circuitry. The processing system can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

Suitable computer readable media may include storage or memory media such as the memory circuitry 332B illustrated herein. For example, the memory circuitry 332B may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory.

EXEMPLARY EMBODIMENTS

Example 1 includes a method of determining frequency channel assignments to radios, comprising: creating a new network graph or modifying a previously existing network graph; using the new or modified network graph, determining an interference network graph for radios authorized to transmit in the shared spectrum using a transmit power spectral density level and a frequency channel specifically requested by each radio, where the interference network graph comprises at least two nodes and at least one interference edge connecting two nodes, and where each node comprises one or more radios operated by the same operator; determining a chromatic number, z, of the interference network graph; determining combinations or permutations of frequency channel mappings for a number of frequencies, n, that can be assigned to at least one radio in each of the nodes of the interference network graph; for each frequency channel mapping of the determined combinations or permutations of the frequency channel mappings that can be assigned to the radios of the different nodes, determining a maximum transmit power spectral density level that is allowable for all radios of each node so that an aggregate interference level at at least one protection point will not exceed an aggregate interference threshold level; using a cost function, determining an assignment of frequency channels to radios of each node that results in at least one of: (a) an enhanced transmit power-bandwidth product or an enhanced probable transmit power-bandwidth product for all radios, (b) diminished interference between radios of different nodes, and (c) diminishing changes to frequency channels either requested by or previously assigned to radios; and assigning the determined frequency channels and corresponding resulting enhanced transmit power-bandwidth product levels or probable enhanced transmit power-bandwidth product levels to corresponding radios, where the radios are configured to operate on their assigned frequencies and to transmit at their assigned enhanced transmit power-bandwidth product levels or probable enhanced transmit power-bandwidth product levels.

Example 2 includes the method of Example 1, wherein the cost function is dependent upon at least one of: a transmit power-bandwidth product term of each radio, a level of interference between radios, and changes to frequency channels either requested by or previously assigned to radios.

Example 3 includes the method of any of Examples 1-2, wherein the cost function, C(m), is:

$$C(m) = \frac{\sum_{k=1}^{N}\{w_1 * T_k(m) - w_2 * I_k(m)\}}{\frac{N * \text{maxBW}}{z} * \sum_{k=1}^{N} PCAT_k} - \frac{w_3 * \sum_{k=1}^{N} M_k(m)}{N},$$

where $T_K$ is a throughput function of a $k^{th}$ radio for a $m^{th}$ frequency channel mapping; Ix is an average interference to the $k^{th}$ radio from other radios for the $m^{th}$ frequency channel mapping m; maxBW is a maximum bandwidth for a GAA CBSD; $PCAT_k$ is a maximum power of the $k^{th}$ GAA CBSD); N is the number of CBSDs in the interference network graph; $T_k(m)=P_k(m)*BW_k(m)$, where is $P_k$ Tx power spectral density and $BW_k$ is a bandwidth for the $k^{th}$ radio for the $m^{th}$ channel mapping; $I_k(M)=\Sigma_{l\neq k}{}^{N}I_l(m)$; where $I_k$ is the aggregate interference from other radios at a $k^{th}$ radio in overlapping bandwidth, and where $I_l(m)$ is an interference at the $k^{th}$ radio from a $l^{th}$ radio in the overlapping bandwidth; $M_k(m)$ is the mis-match factor; and w1, w2 and w3 are weighting factors; and wherein determining an assignment of frequency channels to the radios of each node comprises determining a maximum value of the cost function.

Example 4 includes the method of Example 3, wherein $M_k=0$ if a $k^{th}$ radio of a corresponding node is assigned its requested frequency channel and $M_k=1$ if the $k^{th}$ radio of the corresponding node is not assigned its requested frequency channel.

Example 5 includes the method of any of Examples 1-4, wherein determining the value for the cost function comprises determining the determining a value for the cost function subject at least one constraint compromising at least one of: assigning contiguous frequency channels to operators a same radio access technology (RAT), transmission synchronization of network radios, and timing of uplink and downlink radios signals in time division duplexing radio networks; assigned frequency channels to other operators that are not adjacent to the frequency channels assigned to the coordinated operators; and (c) maintaining an absolute value of a difference between (i) a transmit power spectral density level of an individual radio and (ii) an average transmit power spectral density level of the set of radios utilizing the same frequency channel as the individual radio less than a delta power threshold level.

Example 6 includes the method of any of Examples 1-5, further comprising receiving a requested frequency channel for a radio from an element management system of a radio access network which comprises the radio.

Example 7 includes the method of any of Examples 1-6, wherein determining permutations of frequency channel mappings when utilizing opportunistic spectrum sharing comprises: determining a number of combinations of $$\binom{n}{z}$$

of the chromatic number z, where $$\binom{n}{z} = \frac{n!}{z!\,(n-z)!}$$

when utilizing non-opportunistic spectrum sharing, where n is the number of frequency channels, and where n is greater than z.

Example 8 includes the method of any of Examples 1-7, wherein determining the interference network graph comprises determining an interference edge by if a sum of a first edge parameter and a second edge parameter divided by two exceeds the interference edge threshold level, where the first edge parameter is a ratio of an average power spectral density level of radios of a first node in an overlap region, formed by overlapping cell coverage areas, to an average power spectral density level of radios of a second node in the overlap region, and where the second edge parameter is the inverse of the first edge parameter.

Example 9 includes a program product comprising a non-transitory processor readable medium on which program instructions are embodied, wherein the program instructions are configured, when executed by at least one programmable processor, to cause the at least one programmable processor to: create a new network graph or modifying a previously existing network graph; use the new or modified network graph, determining an interference network graph for radios authorized to transmit in the shared spectrum using a transmit power spectral density level and a frequency channel specifically requested by each radio, where the interference network graph comprises at least two nodes and at least one interference edge connecting two nodes, and where each node comprises one or more radios operated by the same operator; determine a chromatic number, z, of the interference network graph; determine combinations or permutations of frequency channel mappings for a number of frequencies, n, that can be assigned to at least one radio in each of the nodes of the interference network graph; for each frequency channel mapping of the determined combinations or permutations of the frequency channel mappings that can be assigned to the radios of the different nodes, determine a maximum transmit power spectral density level that is allowable for all radios of each node so that an aggregate interference level at at least one protection point will not exceed an aggregate interference threshold level; using a cost function, determine an assignment of frequency channels to radios of each node that results in at least one of: (a) an enhanced transmit power-bandwidth product or an enhanced probable transmit power-bandwidth product for all radios, (b) diminished interference between radios of different nodes, and (c) diminishing changes to frequency channels either requested by or previously assigned to radios; and assign the determined frequency channels and corresponding resulting enhanced transmit power-bandwidth product levels or probable enhanced transmit power-bandwidth product levels to corresponding radios, where the radios are configured to operate on their assigned frequencies and to transmit at their assigned enhanced transmit power-bandwidth product levels or probable enhanced transmit power-bandwidth product levels.

Example 10 includes the program product of Example 9, wherein the cost function is dependent upon at least one of: a transmit power-bandwidth product term of each radio, a level of interference between radios, and changes to frequency channels either requested by or previously assigned to radios.

Example 11 includes the program product of any of Examples 9-10, wherein the cost function, C(m), is:

$$C(m) = \frac{\sum_{k=1}^{N}\{w_1 * T_k(m) - w_2 * I_k(m)\}}{\frac{N*\max BW}{z} * \sum_{k=1}^{N} PCAT_k} - \frac{w_3 * \sum_{k=1}^{N} M_k(m)}{N},$$

where $T_K$ is a throughput function of a $k^{th}$ radio for a $m^{th}$ frequency channel mapping; $I_K$ is an average interference to the $k^{th}$ radio from other radios for the $m^{th}$ frequency channel mapping m; maxBW is a maximum bandwidth for a GAA CBSD; $PCAT_k$ is a maximum power of the $k^{th}$ GAA CBSD); N is the number of CBSDs in the interference network graph; $T_k(M)=P_k(m)*BW_k(m)$, where is $P_k$ Tx power spectral density and $BW_k$ is a bandwidth for the $k^{th}$ radio for the $m^{th}$ channel mapping; $I_k(m)$ $\Sigma_{l \neq k}{}^{N} I_l(m)$; where $I_k$ is the aggregate interference from other radios at a $k^{th}$ radio in overlapping bandwidth, and where $I_l(m)$ is an interference at the $k^{th}$ radio from a $l^{th}$ radio in the overlapping bandwidth; $M_k(m)$ is the mis-match factor; and w1, w2 and w3 are weighting factors; and wherein determine an assignment of frequency channels to the radios of each node comprises determine a maximum value of the cost function.

Example 12 includes the program product of Example 11, wherein $M_k=0$ if a $k^{th}$ radio of a corresponding node is assigned its requested frequency channel and $M_k=1$ if the $k^{th}$ radio of the corresponding node is not assigned its requested frequency channel.

Example 13 includes the program product of any of Examples 9-12, wherein determine the value for the cost function comprises determine the determining a value for the cost function subject at least one constraint compromising at least one of: assign contiguous frequency channels to operators a same radio access technology (RAT), transmission synchronization of network radios, and timing of uplink and downlink radios signals in time division duplexing radio networks; assign frequency channels to other operators that are not adjacent to the frequency channels assigned to the coordinated operators; and (c) maintain an absolute value of a difference between (i) a transmit power spectral density level of an individual radio and (ii) an average transmit power spectral density level of the set of radios utilizing the same frequency channel as the individual radio less than a delta power threshold level.

Example 14 includes the program product of any of Examples 9-13, wherein determine permutations of frequency channel mappings when utilizing opportunistic spectrum sharing comprises: determine a number of combinations of $$\binom{n}{z}$$

of the chromatic number z, where $$\binom{n}{z} = \frac{n!}{z!(n-z)!}$$

when utilizing non-opportunistic spectrum sharing, where n is the number of frequency channels, and where n is greater than z.

Example 15 includes the program product of any of Examples 9, wherein determine the interference network graph comprises determine an interference edge by if a sum of a first edge parameter and a second edge parameter divided by two exceeds the interference edge threshold level, where the first edge parameter is a ratio of an average power spectral density level of radios of a first node in an overlap region, formed by overlapping cell coverage areas, to an average power spectral density level of radios of a second node in the overlap region, and where the second edge parameter is the inverse of the first edge parameter.

Example 16 includes a system, comprising: a processing circuitry; a communications system coupled to the processing circuitry; at least one radio coupled to the communications system; and wherein the processing circuitry is configured to: create a new network graph or modifying a previously existing network graph; use the new or modified network graph, determining an interference network graph for radios authorized to transmit in the shared spectrum using a transmit power spectral density level and a frequency channel specifically requested by each radio, where the interference network graph comprises at least two nodes and at least one interference edge connecting two nodes, and where each node comprises one or more radios operated by the same operator; determine a chromatic number, z, of the interference network graph; determine combinations or permutations of frequency channel mappings for a number of frequencies, n, that can be assigned to at least one radio in each of the nodes of the interference network graph; for each frequency channel mapping of the determined combinations or permutations of the frequency channel mappings that can be assigned to the radios of the different nodes, determine a maximum transmit power spectral density level that is allowable for all radios of each node so that an aggregate interference level at at least one protection point will not exceed an aggregate interference threshold level; using a cost function, determine an assignment of frequency channels to radios of each node that results in at least one of: (a) an enhanced transmit power-bandwidth product or an enhanced probable transmit power-bandwidth product for all radios, (b) diminished interference between radios of different nodes, and (c) diminishing changes to frequency channels either requested by or previously assigned to radios; and assign the determined frequency channels and corresponding resulting enhanced transmit power-bandwidth product levels or probable enhanced transmit power-bandwidth product levels to corresponding radios, where the radios are configured to operate on their assigned frequencies and to transmit at their assigned enhanced transmit power-bandwidth product levels or probable enhanced transmit power-bandwidth product levels.

Example 17 includes the system of Example 16, wherein the cost function is dependent upon at least one of: a transmit power-bandwidth product term of each radio, a level of interference between radios, and changes to frequency channels either requested by or previously assigned to radios.

Example 18 includes the system of any of Examples 16-17, wherein the cost function, C(m), is:

$$C(m) = \frac{\sum_{k=1}^{N}\{w_1 * T_k(m) - w_2 * I_k(m)\}}{\frac{N * maxBW}{z} * \sum_{k=1}^{N} PCAT_k} - \frac{w_3 * \sum_{k=1}^{N} M_k(m)}{N},$$

where $T_K$ is a throughput function of a $k^{th}$ radio for a $m^{th}$ frequency channel mapping; $I_K$ is an average interference to the $k^{th}$ radio from other radios for the $m^{th}$ frequency channel mapping m; maxBW is a maximum bandwidth for a GAA CBSD; $PCAT_k$ is a maximum power of the $k^{th}$ GAA CBSD); N is the number of CBSDs in the interference network graph; $T_k(m)=P_k(m)*BW_k(m)$, where is $P_k$ Tx power spectral density and $BW_k$ is a bandwidth for the $k^{th}$ radio for the $m^{th}$ channel mapping; $I_k(m)=\sum_{l \neq k}^{N} I_l(m)$; where $I_k$ is the aggregate interference from other radios at a $k^{th}$ radio in overlapping bandwidth, and where $I_l(m)$ is an interference at the $k^{th}$ radio from a $l^{th}$ radio in the overlapping bandwidth; $M_k(m)$ is the mis-match factor; and w1, w2 and w3 are weighting factors; and wherein determine an assignment of frequency channels to the radios of each node comprises determine a maximum value of the cost function.

Example 19 includes the system of any of Examples 18, wherein $M_k=0$ if a $k^{th}$ radio of a corresponding node is assigned its requested frequency channel and $M_k=1$ if the $k^{th}$ radio of the corresponding node is not assigned its requested frequency channel.

Example 20 includes the system of any of Examples 16-19, wherein determine the value for the cost function comprises determine the determining a value for the cost function subject at least one constraint comprising at least one of: assign contiguous frequency channels to operators a same radio access technology (RAT), transmission synchronization of network radios, and timing of uplink and downlink radios signals in time division duplexing radio networks; assign frequency channels to other operators that are not adjacent to the frequency channels assigned to the coordinated operators; and maintain an absolute value of a difference between (i) a transmit power spectral density level of an individual radio and (ii) an average transmit power spectral density level of the set of radios utilizing the same frequency channel as the individual radio less than a delta power threshold level.

Example 21 includes the system of any of Examples 16-20, wherein determine permutations of frequency channel mappings when utilizing opportunistic spectrum sharing comprises: determine a number of combinations of $$\binom{n}{z}$$

of the chromatic number z, where $$\binom{n}{z} = \frac{n!}{z!(n-z)!}$$

when utilizing non-opportunistic spectrum sharing, where n is the number of frequency channels, and where n is greater than z.

Example 22 includes the system of any of Examples 16-21, wherein determine the interference network graph comprises determine an interference edge by if a sum of a first edge parameter and a second edge parameter divided by two exceeds the interference edge threshold level, where the first edge parameter is a ratio of an average power spectral density level of radios of a first node in an overlap region, formed by overlapping cell coverage areas, to an average power spectral density level of radios of a second node in the overlap region, and where the second edge parameter is the inverse of the first edge parameter.

Example 23 includes the system of any of Examples 16-22, wherein at least one of an environmental sensing capability system is coupled to the processing circuitry.

Example 24 includes the system of any of Examples 16-23, wherein at least one of at least one external database, and at least one other spectrum access system are coupled to the processing circuitry.

Example 25 includes the system of any of Examples 16-24, wherein the at least one radio comprises a radio element management system.

Several embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method of determining frequency channel assignments to radios, comprising:
creating a new network graph or modifying a previously existing network graph;
using the new or the modified network graph, determining an interference network graph, for radios authorized to transmit in shared spectrum, using a transmit power spectral density level and a frequency channel specifically requested by each radio, where the interference network graph comprises at least two nodes and at least one interference edge connecting two nodes, where each node comprises one or more radios operated by a same operator, and where each radio is a base station configured to communicate with user equipment;
determining a chromatic number, z, of the interference network graph;
determining, using the chromatic number, combinations or permutations of frequency channel mappings for a number of frequencies, n, that can be assigned to at least one radio in each node of the interference network graph;

for each frequency channel mapping of the determined combinations or permutations of the frequency channel mappings that can be assigned to the radios of different nodes, determining a maximum transmit power spectral density level that is allowable for all radios of each node so that an aggregate interference level at at least one protection point will not exceed an aggregate interference threshold level;
using a cost function, determining an assignment of frequency channels to radios of each node that results in at least one of: (a) an enhanced transmit power-bandwidth product or an enhanced probable transmit power-bandwidth product for all radios, (b) diminished interference between radios of the different nodes, and (c) diminishing changes to frequency channels either requested by or previously assigned to radios; and
assigning the determined assignment of frequency channels and corresponding resulting enhanced transmit power-bandwidth product levels or probable enhanced transmit power-bandwidth product levels to corresponding radios, where the radios are configured to operate on their assigned frequencies and to transmit at their assigned enhanced transmit power-bandwidth product levels or probable enhanced transmit power-bandwidth product levels.

2. The method of claim 1, wherein the cost function is dependent upon at least one of: a transmit power-bandwidth product term of each radio, a level of interference between radios, and changes to frequency channels either requested by or previously assigned to radios.

3. The method of claim 1, wherein the cost function, C(m), is:

$$C(m) = \frac{\sum_{k=1}^{N}\{w_1 * T_k(m) - w_2 * I_k(m)\}}{\frac{N * \text{maxBW}}{z} * \sum_{k=1}^{N} PCAT_k} - \frac{w_3 * \sum_{k=1}^{N} M_k(m)}{N},$$

where $T_K$ is a throughput function of a $k^{th}$ radio for a $m^{th}$ frequency channel mapping;
$I_K$ is an average interference to the $k^{th}$ radio from other radios for the $m^{th}$ frequency channel mapping;
maxBW is a maximum bandwidth for a radio;
$PCAT_K$ is a maximum power of the $k^{th}$ radio;
N is a number of radios in the interference network graph;

$$T_k(m) = P_k(m) * BW_k(m),$$

where $P_k$ is Tx power spectral density and $BW_k$ is a bandwidth for the $k^{th}$ radio for the $m^{th}$ frequency channel mapping;

$$I_k(m) = \sum_{l \neq k}^{N} I_l(m);$$

where $I_k$ is an aggregate interference level from other radios at a $k^{th}$ radio in overlapping bandwidth, and
where $I_l(m)$ is an interference at the $k^{th}$ radio from a $l^{th}$ radio in the overlapping bandwidth;
$M_k(m)$ is a mis-match factor; and
w1, w2 and w3 are weighting factors; and
wherein determining an assignment of frequency channels to the radios of each node comprises determining a maximum value of the cost function.

4. The method of claim 3, wherein $M_k=0$ if a $k^{th}$ radio of a corresponding node is assigned its requested frequency channel and $M_k=1$ if the $k^{th}$ radio of the corresponding node is not assigned its requested frequency channel.

5. The method of claim 1, wherein a value for the cost function is determined subject to at least one constraint by at least one of:
   (a) assigning contiguous frequency channels to operators using a same radio access technology (RAT), transmission synchronization of network radios, and timing of uplink and downlink radios signals in time division duplexing radio networks;
   (b) assigning frequency channels to other operators that are not adjacent to the frequency channels assigned to coordinated operators; and
   (c) maintaining an absolute value of a difference between (i) a transmit power spectral density level of an individual radio and (ii) an average transmit power spectral density level of a set of radios utilizing a same frequency channel as the individual radio less than a delta power threshold level.

6. The method of claim 1, further comprising receiving a requested frequency channel for a radio from an element management system of a radio access network which comprises the radio.

7. The method of claim 1, wherein determining permutations of frequency channel mappings when utilizing opportunistic spectrum sharing comprises:
   determining a number of combinations of $$\binom{n}{z}$$

of the chromatic number z, where $$\binom{n}{z} = \frac{n!}{z!\,(n-z)!}$$

when utilizing non-opportunistic spectrum sharing, where n is a number of frequency channels, and where the n is greater than z.

8. The method of claim 1, wherein determining the interference network graph comprises determining an interference edge by if a sum of a first edge parameter and a second edge parameter divided by two exceeds an interference edge threshold level, where the first edge parameter is a ratio of an average power spectral density level of radios of a first node in an overlap region, formed by overlapping cell coverage areas, to an average power spectral density level of radios of a second node in the overlap region, and where the second edge parameter is an inverse of the first edge parameter.

9. A program product comprising a non-transitory processor readable medium on which program instructions are embodied, wherein the program instructions are configured, when executed by at least one programmable processor, to cause the at least one programmable processor to:
   create a new network graph or modifying a previously existing network graph;
   use the new or the modified network graph, determining an interference network graph, for radios authorized to transmit in shared spectrum, using a transmit power spectral density level and a frequency channel specifically requested by each radio, where the interference network graph comprises at least two nodes and at least one interference edge connecting two nodes, where each node comprises one or more radios operated by a same operator, and where each radio is a base station configured to communicate with user equipment;
   determine a chromatic number, z, of the interference network graph;
   determine, using the chromatic number, combinations or permutations of frequency channel mappings for a number of frequencies, n, that can be assigned to at least one radio in each node of the interference network graph;
   for each frequency channel mapping of the determined combinations or permutations of the frequency channel mappings that can be assigned to the radios of different nodes, determine a maximum transmit power spectral density level that is allowable for all radios of each node so that an aggregate interference level at at least one protection point will not exceed an aggregate interference threshold level;
   using a cost function, determine an assignment of frequency channels to radios of each node that results in at least one of: (a) an enhanced transmit power-bandwidth product or an enhanced probable transmit power-bandwidth product for all radios, (b) diminished interference between radios of the different nodes, and (c) diminishing changes to frequency channels either requested by or previously assigned to radios; and
   assign the determined assignment of frequency channels and corresponding resulting enhanced transmit power-bandwidth product levels or probable enhanced transmit power-bandwidth product levels to corresponding radios, where the radios are configured to operate on their assigned frequencies and to transmit at their assigned enhanced transmit power-bandwidth product levels or probable enhanced transmit power-bandwidth product levels.

10. The program product of claim 9, wherein the cost function is dependent upon at least one of: a transmit power-bandwidth product term of each radio, a level of interference between radios, and changes to frequency channels either requested by or previously assigned to radios.

11. The program product of claim 9, wherein the cost function, C(m), is:

$$C(m) = \frac{\sum_{k=1}^{N}\{w_1 * T_k(m) - w_2 * I_k(m)\}}{\frac{N * \text{maxBW}}{z} * \sum_{k=1}^{N} PCAT_k} - \frac{w_3 * \sum_{k=1}^{N} M_k(m)}{N},$$

where $T_K$ is a throughput function of a $k^{th}$ radio for a $m^{th}$ frequency channel mapping;
$I_K$ is an average interference to the $k^{th}$ radio from other radios for the $m^{th}$ frequency channel mapping;
maxBW is a maximum bandwidth for a radio;
$PCAT_k$ is a maximum power of the $k^{th}$ radio;
N is a number of radios in the interference network graph;

$$T_k(m) = P_k(m) * BW_k(m),$$

where is $P_k$ Tx power spectral density and $BW_k$ is a bandwidth for the $k^{th}$ radio for the $m^{th}$ frequency channel mapping;

$$I_k(m) = \Sigma_{l \neq k}^N I_l(m);$$

where $I_k$ is an aggregate interference level from other radios at a $k^{th}$ radio in overlapping bandwidth, and
where $I_l(m)$ is an interference at the $k^{th}$ radio from a $l^{th}$ radio in the overlapping bandwidth;
$M_k(m)$ is a mis-match factor; and
w1, w2 and w3 are weighting factors; and
wherein determine an assignment of frequency channels to the radios of each node comprises determine a maximum value of the cost function.

12. The program product of claim 11, wherein $M_k=0$ if a $k^{th}$ radio of a corresponding node is assigned its requested frequency channel and $M_k=1$ if the $k^{th}$ radio of the corresponding node is not assigned its requested frequency channel.

13. The program product of claim 9, wherein a value for the cost function is determined subject to at least one constraint by at least one of:
(a) assigning contiguous frequency channels to operators using a same radio access technology (RAT), transmission synchronization of network radios, and timing of uplink and downlink radios signals in time division duplexing radio networks;
(b) assigning frequency channels to other operators that are not adjacent to the frequency channels assigned to coordinated operators; and
(c) maintaining an absolute value of a difference between (i) a transmit power spectral density level of an individual radio and (ii) an average transmit power spectral density level of a set of radios utilizing a same frequency channel as the individual radio less than a delta power threshold level.

14. The program product of claim 9, wherein determine permutations of frequency channel mappings when utilizing opportunistic spectrum sharing comprises:
determine a number of combinations of $$\binom{n}{z}$$

of the chromatic number z, where $$\binom{n}{z} = \frac{n!}{z!(n-z)!}$$

when utilizing non-opportunistic spectrum sharing, where n is a number of frequency channels, and where the n is greater than z.

15. The program product of claim 9, wherein determine the interference network graph comprises determine an interference edge by if a sum of a first edge parameter and a second edge parameter divided by two exceeds an interference edge threshold level, where the first edge parameter is a ratio of an average power spectral density level of radios of a first node in an overlap region, formed by overlapping cell coverage areas, to an average power spectral density level of radios of a second node in the overlap region, and where the second edge parameter is an inverse of the first edge parameter.

16. A system, comprising:
a processing circuitry configured to be coupled to at least one radio and configured to:
create a new network graph or modifying a previously existing network graph;
use the new or the modified network graph, determining an interference network graph, for radios authorized to transmit in shared spectrum, using a transmit power spectral density level and a frequency channel specifically requested by each radio, where the interference network graph comprises at least two nodes and at least one interference edge connecting two nodes, where each node comprises one or more radios operated by a same operator, and where each radio is a base station configured to communicate with user equipment;
determine a chromatic number, z, of the interference network graph;
determine, using the chromatic number, combinations or permutations of frequency channel mappings for a number of frequencies, n, that can be assigned to at least one radio in each node of the interference network graph;
for each frequency channel mapping of the determined combinations or permutations of the frequency channel mappings that can be assigned to the radios of different nodes, determine a maximum transmit power spectral density level that is allowable for all radios of each node so that an aggregate interference level at at least one protection point will not exceed an aggregate interference threshold level;
using a cost function, determine an assignment of frequency channels to radios of each node that results in at least one of: (a) an enhanced transmit power-bandwidth product or an enhanced probable transmit power-bandwidth product for all radios, (b) diminished interference between radios of the different nodes, and (c) diminishing changes to frequency channels either requested by or previously assigned to radios; and
assign the determined assignment of frequency channels and corresponding resulting enhanced transmit power-bandwidth product levels or probable enhanced transmit power-bandwidth product levels to corresponding radios, where the radios are configured to operate on their assigned frequencies and to transmit at their assigned enhanced transmit power-bandwidth product levels or probable enhanced transmit power-bandwidth product levels.

17. The system of claim 16, wherein the cost function is dependent upon at least one of: a transmit power-bandwidth product term of each radio, a level of interference between radios, and changes to frequency channels either requested by or previously assigned to radios.

18. The system of claim 16, wherein the cost function, C(m), is:

$$C(m) = \frac{\Sigma_{k=1}^N \{w_1 * T_k(m) - w_2 * I_k(m)\}}{\frac{N * \max BW}{z} * \Sigma_{k=1}^N PCAT_k} - \frac{w_3 * \Sigma_{k=1}^N M_k(m)}{N},$$

where $T_K$ is a throughput function of a $k^{th}$ radio for a $m^{th}$ frequency channel mapping;
$I_K$ is an average interference to the $k^{th}$ radio from other radios for the $m^{th}$ frequency channel mapping;

maxBW is a maximum bandwidth for a radio;
PCAT$_k$ is a maximum power of the k$^{th}$ radio;
N is a number of radios in the interference network graph;

$$T_k(m) = P_k(m) * BW_k(m),$$

where is P$_k$ Tx power spectral density and BW$_k$ is a bandwidth for the k$^{th}$ radio for the m$^{th}$ frequency channel mapping;

$$I_k(m) = \Sigma_{l \neq k}^{N} I_l(m);$$

where I$_k$ is an aggregate interference level from other radios at a k$^{th}$ radio in overlapping bandwidth, and
where I$_l$(m) is an interference at the k$^{th}$ radio from a l$^{th}$ radio in the overlapping bandwidth;
M$_k$(m) is a mis-match factor; and
w1, w2 and w3 are weighting factors; and
wherein determine an assignment of frequency channels to the radios of each node comprises determine a maximum value of the cost function.

19. The system of claim 18, wherein M$_k$=0 if a k$^{th}$ radio of a corresponding node is assigned its requested frequency channel and M$_k$=1 if the k$^{th}$ radio of the corresponding node is not assigned its requested frequency channel.

20. The system of claim 16, wherein a value for a cost function is determined subject at least one constraint by at least one of:
(a) assigning contiguous frequency channels to operators using a same radio access technology (RAT), transmission synchronization of network radios, and timing of uplink and downlink radios signals in time division duplexing radio networks;
(b) assigning frequency channels to other operators that are not adjacent to the frequency channels assigned to coordinated operators; and
(c) maintaining an absolute value of a difference between (i) a transmit power spectral density level of an individual radio and (ii) an average transmit power spectral density level of a set of radios utilizing a same frequency channel as the individual radio less than a delta power threshold level.

21. The system of claim 16, wherein determine permutations of frequency channel mappings when utilizing opportunistic spectrum sharing comprises:
determine a number of combinations of $$\binom{n}{z}$$

or the chromatic number z, where $$\binom{n}{z} = \frac{n!}{z!(n-z)!}$$

when utilizing non-opportunistic spectrum sharing, where n is a number of frequency channels, and where the n is greater than z.

22. The system of claim 16, wherein determine the interference network graph comprises determine an interference edge by if a sum of a first edge parameter and a second edge parameter divided by two exceeds an interference edge threshold level, where the first edge parameter is a ratio of an average power spectral density level of radios of a first node in an overlap region, formed by overlapping cell coverage areas, to an average power spectral density level of radios of a second node in the overlap region, and where the second edge parameter is an inverse of the first edge parameter.

23. The system of claim 16, wherein at least one of an environmental sensing capability system is coupled to the processing circuitry.

24. The system of claim 16, wherein at least one of at least one external database, and at least one other spectrum access system are coupled to the processing circuitry.

25. The system of claim 16, wherein the at least one radio comprises a radio element management system.

* * * * *

UNITED STATES PATENT AND TRADEMARK OFFICE
CERTIFICATE OF CORRECTION

PATENT NO. : 12,069,631 B2
APPLICATION NO. : 17/601300
DATED : August 20, 2024
INVENTOR(S) : Hannan et al.

It is certified that error appears in the above-identified patent and that said Letters Patent is hereby corrected as shown below:

On the Title Page

At Column 1 (86), please insert --Related U.S. Provisional Application Data Provisional application No. US 62/830947, filed on Apr. 08, 2019-- between "(2) Date: Oct. 4, 2021" and "(87) PCT Pub. No.: WO2020/209941".

In the Claims

At Column 24, Line 13, please remove "or" between "of" and "$\binom{n}{z}$".

Signed and Sealed this
Eighth Day of October, 2024

Katherine Kelly Vidal
*Director of the United States Patent and Trademark Office*